Figure 1:
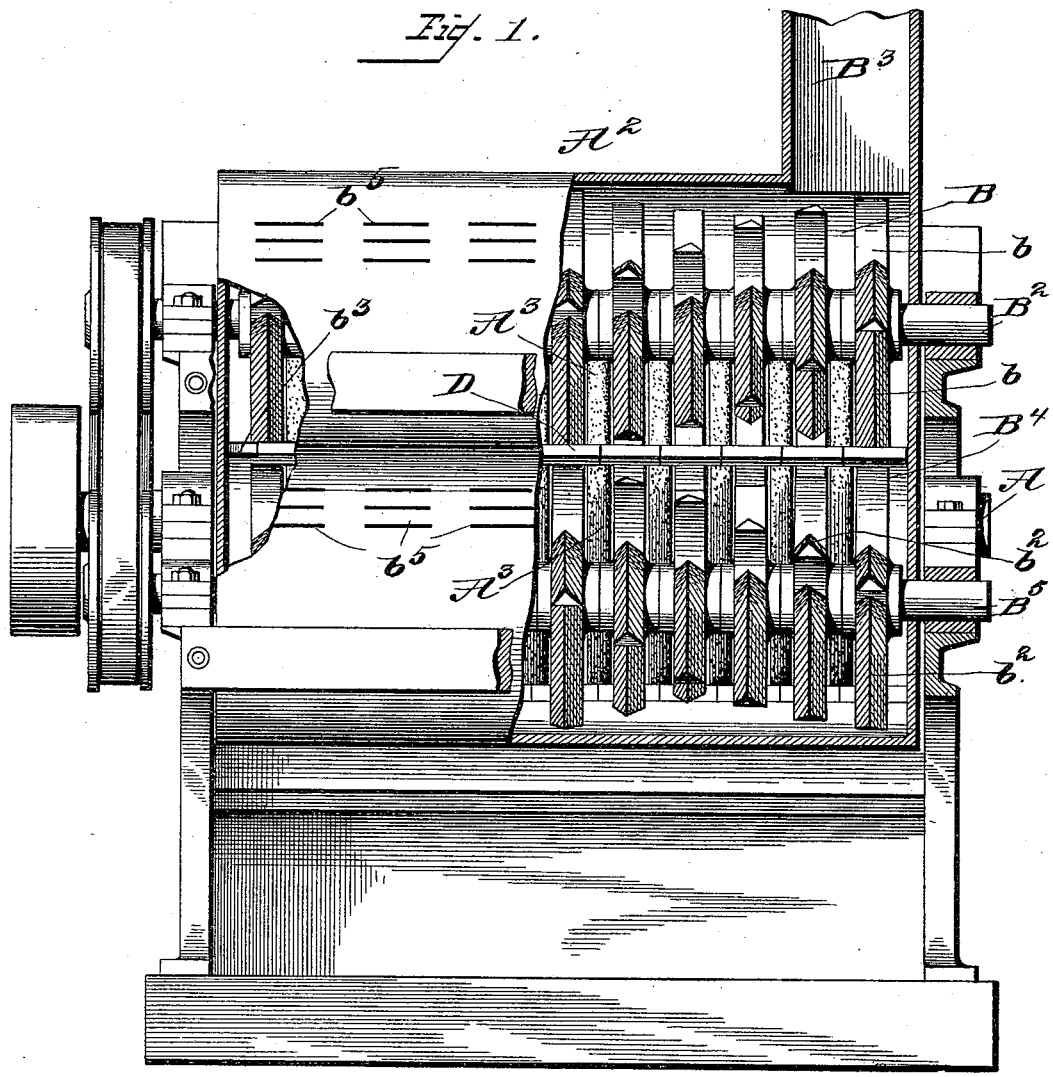

(No Model.)  3 Sheets—Sheet 1.

J. M. GARDNER.
MACHINE FOR DELINTING COTTON SEED.

No. 451,868. Patented May 5, 1891.

Witnesses

Inventor
Jefferson M. Gardner,
By his Attorney (No Model.) 3 Sheets—Sheet 2.

J. M. GARDNER.
MACHINE FOR DELINTING COTTON SEED.

No. 451,868. Patented May 5, 1891.

Witnesses
Inventor
Jefferson M. Gardner,
By his Attorney (No Model.) 3 Sheets—Sheet 3.
J. M. GARDNER.
MACHINE FOR DELINTING COTTON SEED.
No. 451,868. Patented May 5, 1891.
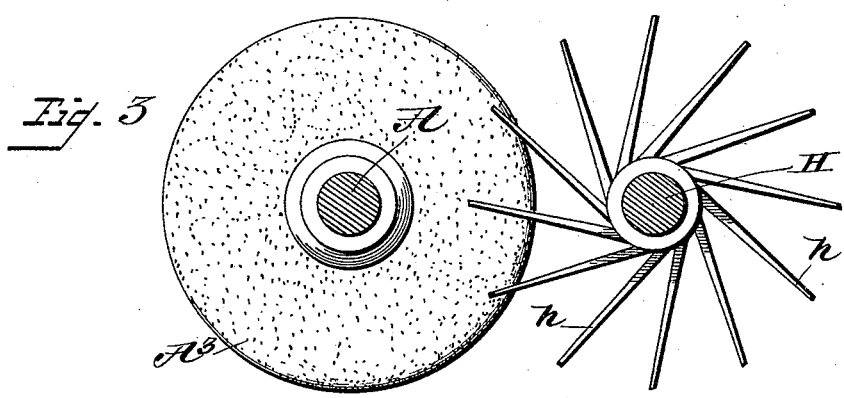
Fig. 3
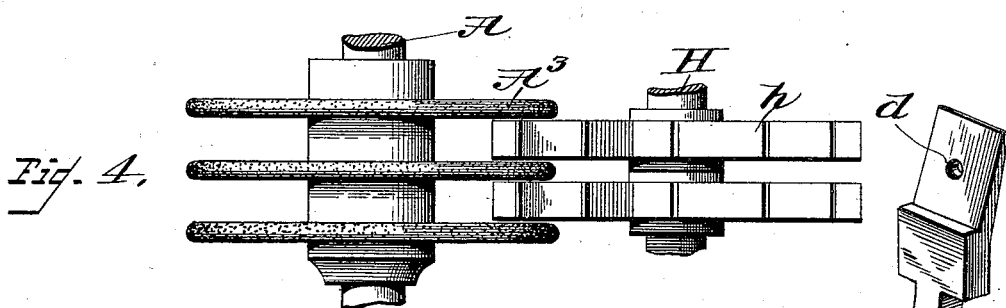
Fig. 4.
Fig. 5.
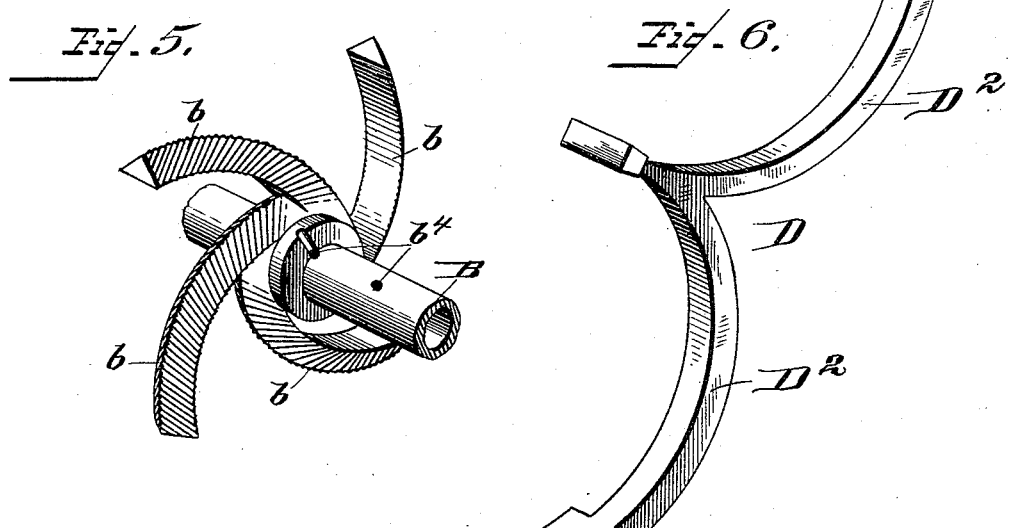
Fig. 6.
Witnesses
Inventor
Jefferson M. Gardner.
By his Attorney

UNITED STATES PATENT OFFICE.

JEFFERSON M. GARDNER, OF NASHVILLE, ASSIGNOR OF ONE-HALF TO CLEMENT C. GLOVER, OF MEMPHIS, TENNESSEE.

MACHINE FOR DELINTING COTTON-SEED.

SPECIFICATION forming part of Letters Patent No. 451,868, dated May 5, 1891.

Application filed February 4, 1891. Serial No. 380,231. (No model.)

*To all whom it may concern:*

Be it known that I, JEFFERSON M. GARDNER, a citizen of the United States, residing at Nashville, in the county of Davidson and State of Tennessee, have invented certain new and useful Improvements in Machines for Delinting Cotton-Seed; and I do hereby declare the following to be a full, clear, and exact description of the invention, such as will enable others skilled in the art to which it appertains to make and use the same.

This invention relates to machines for delinting cotton-seed.

The object of the invention is to produce a machine for delinting cotton-seed, whereby cotton-seed in large quantities may be treated in a rapid and cheap manner effectually to remove from the seed every particle of lint adhering thereto. Furthermore, the object of the invention is to produce a machine for delinting cotton-seed which in a small compass shall provide a large operating-surface for removing the lint from the seed. Furthermore, the object of the invention is to produce a machine for delinting cotton-seed whereby the seed shall be carried from the point of its introduction into the machine to its discharge from the machine in the presence of a very large operating-surface, and shall be conveyed from the point of introduction to the point of discharge solely by the parts of the machine by which the delinting is accomplished.

With these objects in view the invention consists in a delinting-machine comprising a series of disks or wheels of emery or of some other suitable substance arranged upon a shaft, and a series of projecting arms mounted contiguous to the disks, so arranged that the arms in revolving pass between the disks, the arms being arranged in a chamber into which the disks project.

Furthermore, the invention consists in a delinting-machine comprising a series of disks of emery or of some other suitable substance mounted upon a revoluble shaft, and a series of arms spirally arranged upon a shaft mounted contiguous to the disks, and so arranged that the arms project between the disks.

Furthermore, the invention consists in a machine for delinting cotton-seed comprising a series of disks of emery or other suitable substance, two series of spiral arms, suitably mounted and arranged in such position that their arms project between the disks, the arms of the different series being oppositely arranged, whereby means for conveying the cotton-seed in opposite directions is provided.

Furthermore, the invention consists in a cotton-seed delinter comprising a series of disks of emery or the like mounted upon a revolving shaft, two chambers arranged one above the other and so arranged that each chamber is entered by each disk of the series, a shaft mounted in each chamber and provided with spirally-arranged arms passing between the disks, the arms in each chamber being oppositely arranged, one chamber being provided with an inlet-opening and the other with an outlet-opening, and a passage between the chambers, whereby the seed may pass from one to the other.

Furthermore, the invention consists in a machine for delinting cotton-seed comprising a series of disks of emery or of some other suitable substance, a shaft provided with arms projecting between the disks, and an exhaust-fan placed in the casing with the disks, whereby the lint adhering to the disks is removed.

Furthermore, the invention consists in a machine for delinting cotton-seed comprising a series of disks of emery mounted upon a revoluble shaft, a chamber for containing seed arranged contiguous to the disks, openings through which the disks project into the chamber, and a shaft mounted in the chamber and provided with a series of arms projecting between the disks, the side of the chamber through which the disks project, being formed by ribs, arranged one on each side of each disk a suitable distance from the disk to allow lint to be carried between the two and at the same time to prevent passage of the cotton-seed.

In the accompanying drawings I have illustrated my invention, in which—

Figure 2:
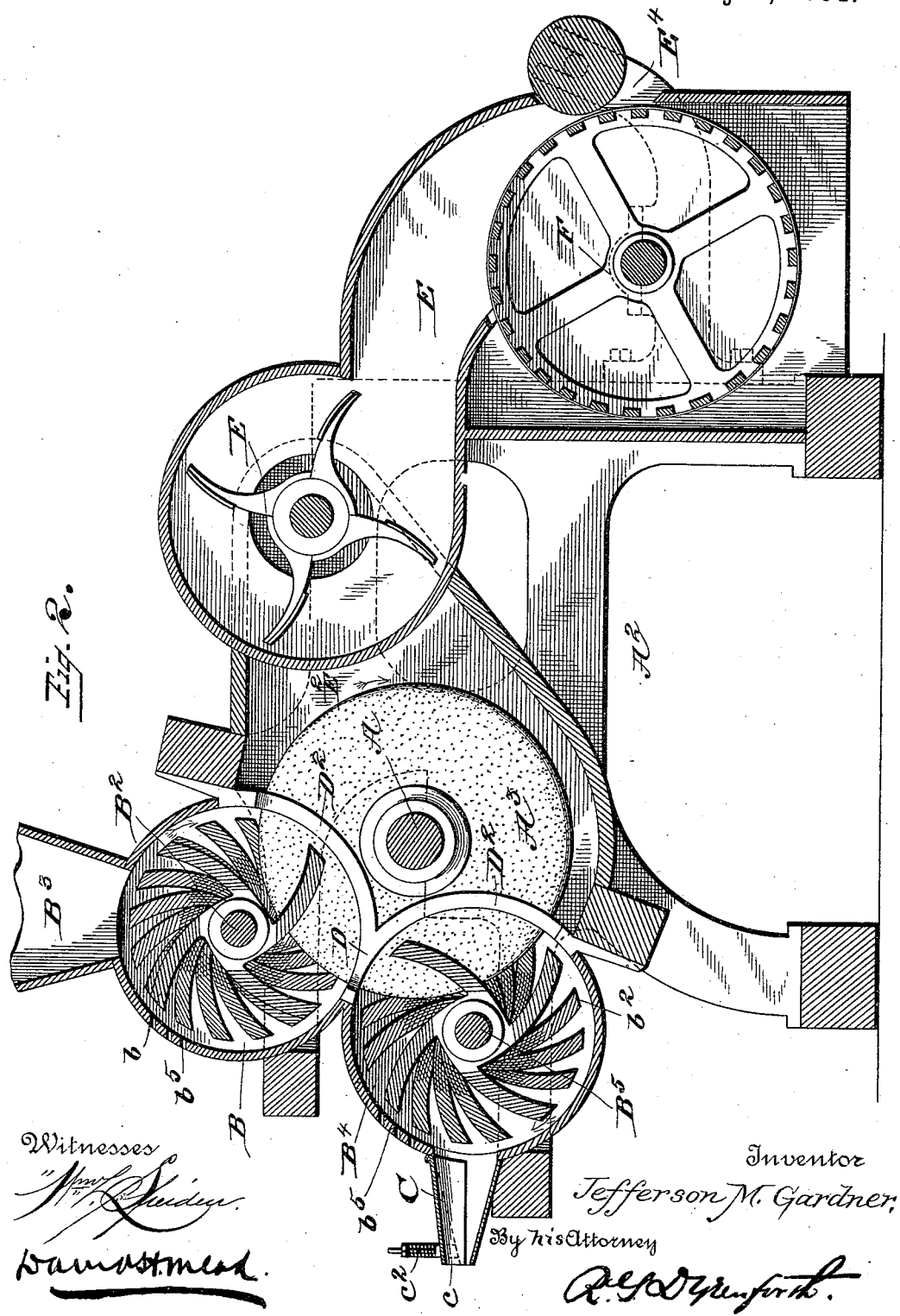

Figure 1 is a front view of a machine constructed in accordance with my invention, a portion of the casing being broken away in order to show the arrangement of the operative parts. Fig. 2 is a longitudinal vertical section of the machine. Fig. 3 is a side elevation of a modified form of device for removing the lint from the disks. Fig. 4 is a plan view of the same. Fig. 5 is a modified form of shaft for carrying the spiral arms arranged adjacent to the disks, and Fig. 6 is a perspective view showing the form of rib employed for forming the sides of the seed-chamber adjacent to the emery-disks.

In the drawings, A represents a shaft suitably mounted in the casing $A^2$ of the machine, upon which shaft are mounted a series of disks $A^3$, which are preferably of emery; but which may be of any other suitable substance of a similar nature. Any desired number of these disks are arranged upon the shaft and are mounted a sufficient distance apart to permit the reception between them of the cotton-seed being acted upon, and of arms or projections whereby the cotton-seed is brought between the disks, rubbed against the same, and removed. Adjacent to the disks are arranged any suitable number of chambers B. In the present embodiment of the invention two of these chambers are shown, one arranged above the other. In the upper chamber B is mounted a shaft $B^2$, provided with a series of arms $b$. These arms are placed upon the shaft, preferably in series of four each, cast or otherwise formed upon a central hub designed to be slid upon a shaft and suitably secured thereto. These arms are preferably triangular in cross-section, and are provided on their oblique faces with corrugations or indentations forming means for preventing slipping of the seed designed to be carried by them between the disks. The arms are spirally arranged upon the shaft, and those of the upper chamber are so inclined as to form a conveyer for removing the cotton-seed from the right-hand end to the left-hand end of the chamber B.

At the right-hand end of the chamber B is a receiving-hopper $B^3$, through which the cotton-seed to be delinted is introduced. The lower chamber $B^4$ is placed adjacent to the upper chamber and is placed the same distance from the shaft A as the upper chamber. The lower chamber is provided with a shaft $B^5$, upon which are mounted a series of arms $b^2$, corresponding to the arms $b$ of the upper chamber, except that they are oppositely inclined to the arms $b$, and thus form a conveyer for removing the cotton-seed from the left to the right end of the machine. It will thus be seen that cotton-seed introduced into the hopper will pass into the right-hand end of the upper chamber B, and from there will be slowly conveyed for contact with the emery disks to the left-hand end of the chamber, where it will reach the passage $b^3$, Fig. 1, through which it will drop to the lower chamber $B^4$, and from this point will be conveyed by the arms $b^2$ to the right-hand end of the lower chamber $B^4$, where it will be discharged through the discharge-opening C.

The sides of the chamber B adjacent to the disk $A^3$ are formed by the ribs D, which are provided with openings $d$ for the passage of bolts or screws, whereby the ribs are attached to suitable portions of the frame of the machine.

The main portions $D^2$ $D^2$ of the ribs, which occupy the positions between the disks $A^3$, are of such width as to leave a small space between the ribs and the disk, this space being sufficiently large to permit the passage between the ribs and the disk of the lint engaged by the disks, and at the same time are not large enough to permit the passage and escape of the seed being treated.

In the rear of the disks $A^3$, and connected therewith by a passage $E^2$, is a suction-fan E, into the eye of which fan the lint carried by the disks is drawn and from which the same is discharged through the passage $E^3$, extending downward and over a roller F, which is covered with wire-cloth to retain the lint, while allowing the air to escape.

The fronts of the casings of the chambers may be provided with openings $b^5$, through which air is to enter and pass through the seed being operated upon and carry with it the lint from the disks or wheels, as drawn rearward by the suction-fan.

The preferred arrangement for allowing the introduction of the air is shown in Fig. 5 of the drawings. Here the shafts B are made hollow and are provided at short intervals with openings $b^4$, so that the air enters through the shafts and escapes into the seed through the openings $b^4$. By this device the air can enter uniformly and pass inward evenly through the fan, avoiding any contention of currents at the circumference of the casing or any backing of the air from the centrifugal action at the arms.

Instead of drawing the air through the cotton-seed, I may employ the device illustrated in side elevation in Fig. 3 and in plan view in Fig. 4. This consists of a shaft H, provided with a series of wings $h$, which project between the disks $A^3$, and, as they rapidly revolve, create a current of air from the disks, carrying with it the lint adhering to the disks.

The lint is discharged at a suitable opening $E^4$, after passing between the cylinder F and a small roller arranged adjacent to the opening $E^4$.

In the operation of the machine, cotton-seed to be delinted is introduced into the hopper $B^4$ of the upper chamber B, and falling through the hopper is engaged by the arms $b$ and is carried thereby between and in close contact with the sides of the emery-disks, which chafe the lint from the seed, the lint being then carried through the ribs forming the sides of the chamber, after which it is drawn away by the suction created by the fan E. The seed in the upper chamber is carried by means of the conveyer from the right to the left end of the chamber B, being carried around by the arms and presented a great number of times to the action of the disks before reaching the left-hand end of the chamber, at which point it is discharged into the lower chamber. As the seed enters the lower chamber it is engaged by the arms $b^2$ of that chamber and carried again into contact with the emery-disks being conveyed in an opposite direction and presented to the rubbing of the disk a great number of times before reaching the discharge opening or spout C, through which the seed passes from the machine. The discharge opening or spout is provided with a contracted outlet-opening, and its upper portion $c$ is hinged and provided with a spring $c^2$, which is mounted adjacent to the hinged portion and bears upon it, which spring is overcome as the seed passes from the machine. The purpose of this construction is to prevent the too ready escape of the seed from the machine and to keep it in the machine until a sufficient quantity is presented to the discharge-opening to raise the hinged portion and permit the escape of the seed.

By reason of the corrugations in the arms $b$ and $b^2$ slipping of the seed longitudinally on the arms—that is to say, throwing of the bulk of the seed to the circumference of the casing by the centrifugal force—is prevented, and the dragging of the seed past and in contact with the disks is insured.

Having thus fully described my invention, what I claim as new, and desire to secure by Letters Patent, is—

1. A delinting-machine comprising a revoluble shaft carrying a series of disks or wheels of emery or of some analogous substance, and a second revoluble shaft mounted contiguous to the first and carrying a series of projecting arms so arranged that the arms in revolving pass between the disks, substantially as described.

2. A delinting-machine comprising a revoluble shaft carrying a series of disks of emery or other analogous substance, and a second revoluble shaft mounted adjacent to the first and carrying a series of arms spirally placed on the shaft, the arms being so arranged that they pass between the disks in revolving, substantially as described.

3. A machine for delinting cotton-seed, comprising a revoluble shaft carrying a series of disks of emery or some other analogous substance, and two revoluble shafts arranged contiguous to the first and each carrying a series of arms spirally arranged, the arms of the two shafts being oppositely placed, both series of arms passing between the disks in revolving, whereby means for conveying the cotton-seed in opposite directions is provided, substantially as described.

4. A cotton-seed delinter comprising a revoluble shaft carrying the series of disks of emery or some analogous substance, two chambers arranged one above the other and so placed that each chamber is entered by each disk of the series, a shaft mounted in each chamber and provided with spirally-arranged arms passing between the disks in revolving, the arms of each chamber being oppositely arranged, one chamber being provided with an inlet-opening and the other with an outlet-opening, and a passage between the chambers, substantially as described.

5. A delinting-machine comprising a revoluble shaft carrying a series of disks or wheels of emery or of some analogous substance, and a second revoluble shaft mounted contiguous to the first and carrying a series of projecting arms so arranged that the arms in revolving pass between the disks, and an exhaust-fan placed in the casing with the disks, whereby the lint adhering to the disks is removed, substantially as described.

6. A cotton-seed-delinting machine comprising a revoluble shaft carrying a series of disks of emery or some analogous substance, a chamber for containing the seed arranged contiguous to the disks, the chamber being provided with openings through which the disks project into the chamber, and a revoluble shaft mounted in the chamber and provided with a series of arms projecting between the disks, the side of the chamber through which the disks pass being formed by ribs arranged one on each side of each disk a suitable distance from the disks to allow lint to be carried between the ribs and the disk and at the same time to prevent passage of the cotton-seed, substantially as described.

7. A cotton-seed-delinting machine comprising a revoluble shaft carrying a series of disks of emery or other analogous substance, a chamber for containing the cotton-seed into which the disks project, a hollow revoluble shaft mounted in the chamber and provided with a series of projecting arms, which pass between the disks in revolving, and with a series of openings through which air is permitted to pass to the chamber, and a suction-fan arranged adjacent to the chamber, substantially as described.

In testimony whereof I affix my signature in presence of two witnesses.

JEFFERSON M. GARDNER.

Witnesses:
DAVID H. MEAD,
F. B. KEEFER.